(12) United States Patent
Nagayama et al.

(10) Patent No.: US 10,020,551 B2
(45) Date of Patent: Jul. 10, 2018

(54) LIQUID ACTIVATED AIR BATTERY

(75) Inventors: Mori Nagayama, Yokohama (JP);
Yoshiko Tsukada, Yokohama (JP);
Nobutaka Chiba, Yokohama (JP);
Atsushi Miyazawa, Kamakura (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 549 days.

(21) Appl. No.: 14/351,684

(22) PCT Filed: Sep. 11, 2012

(86) PCT No.: PCT/JP2012/073164
§ 371 (c)(1),
(2), (4) Date: Jun. 4, 2014

(87) PCT Pub. No.: WO2013/058035
PCT Pub. Date: Apr. 25, 2013

(65) Prior Publication Data
US 2014/0272609 A1    Sep. 18, 2014

(30) Foreign Application Priority Data

Oct. 21, 2011    (JP) ................................. 2011-231432

(51) Int. Cl.
*H01M 12/02*    (2006.01)
*H01M 12/06*    (2006.01)
(Continued)

(52) U.S. Cl.
CPC .............. *H01M 12/02* (2013.01); *H01M 2/40* (2013.01); *H01M 12/06* (2013.01); *H01M 12/08* (2013.01)

(58) Field of Classification Search
CPC ...... H01M 12/02; H01M 12/06; H01M 12/08; H01M 2/40
See application file for complete search history.

(56) References Cited

U.S. PATENT DOCUMENTS

| | | | |
|---|---|---|---|
| 6,558,825 B1* | 5/2003 | Faris | H01M 6/5011 429/404 |
| 2003/0148166 A1* | 8/2003 | DeJohn | H01M 8/04156 429/513 |

(Continued)

FOREIGN PATENT DOCUMENTS

| | | |
|---|---|---|
| CN | 102005627 A | 4/2011 |
| JP | 05-258781 A | 10/1993 |

(Continued)

*Primary Examiner* — Eugenia Wang
(74) *Attorney, Agent, or Firm* — Young Basile Hanlon & MacFarlane, P.C.

(57) ABSTRACT

A liquid activated air battery includes: an electrode assembly that includes an air electrode and a metal anode; a battery container that is capable of holding the electrode assembly and electrolytic solution; a supply tank for the electrolytic solution to be supplied to the battery container; a drainage tank for the electrolytic solution discharged from the battery container; and pumps as an electrolytic solution flow mechanism that runs the electrolytic solution from the supply tank to the drainage tank through the battery container. The composition of the electrolytic solution supplied to the battery container is kept constant, and stable power output is ensured.

10 Claims, 9 Drawing Sheets

(51) Int. Cl.
*H01M 12/08* (2006.01)
*H01M 2/40* (2006.01)

(56) References Cited

U.S. PATENT DOCUMENTS

| | | | | |
|---|---|---|---|---|
| 2004/0072049 A1* | 4/2004 | Becerra | ............... | H01M 8/02 |
| | | | | 429/447 |
| 2004/0180246 A1* | 9/2004 | Smedley | ............ | H01M 4/8605 |
| | | | | 429/406 |
| 2005/0155668 A1* | 7/2005 | Finkelshtain | ..... | H01M 8/04186 |
| | | | | 141/67 |
| 2005/0164065 A1* | 7/2005 | An | .................. | H01M 8/04208 |
| | | | | 137/209 |
| 2006/0127731 A1 | 6/2006 | Faris | | |
| 2009/0214901 A1* | 8/2009 | Dong | ............... | H01M 8/04089 |
| | | | | 429/432 |
| 2010/0196768 A1 | 8/2010 | Roberts et al. | | |

FOREIGN PATENT DOCUMENTS

| | | | |
|---|---|---|---|
| JP | 2010-244731 A | 10/2010 |
| WO | 9408358 A1 | 4/1994 |
| WO | 03058736 A1 | 7/2003 |
| WO | 2008133978 A1 | 11/2008 |

\* cited by examiner

LIQUID ACTIVATED AIR BATTERY

CROSS REFERENCE TO RELATED APPLICATION

The present application claims priority to Japanese Patent Application No. 2011-231432, filed Oct. 21, 2011 and incorporated herein in its entirety.

TECHNICAL FIELD

The present invention relates to an air battery that uses oxygen as a cathode active material, in particular a liquid activated air battery in which electrolytic solution flows during the discharge.

BACKGROUND

One example of conventional air batteries is described in Japanese Patent Unexamined Publication No. 58-32750. The air battery described in Japanese Patent Unexamined Publication No. 58-32750 includes a battery composed of a plurality of unit cells. Electrolytic solution is circulated from a storage tank during the charge, but the storage tank is separated off and the electrolytic solution is circulated from a drainage tank that is attached with the battery during the discharge. The air battery also includes a filter for the electrolytic solution between the storage tank and a pressure pump that supplies the battery with the electrolytic solution from the storage tank.

SUMMARY

Air batteries of this type are subject to decrease in power output, since metal salt is deposited from electrolytic solution along with the discharge, and the deposits causes decrease in conductivity. To cope with this, the above-described conventional air battery includes a filter that can remove the deposits. However, since the electrolytic solution is circulated, the composition of the electrolytic solution gradually changes to cause unstable power output, which has been a problem to be solved.

The present invention has been made in view of the earlier circumstance as described above. It is an object of the present invention to provide a liquid activated air battery that provides stable power output by keeping the composition of electrolytic solution constant that is supplied to the battery.

A liquid activated air battery according to the present invention includes: an electrode assembly that includes an air electrode and a metal anode; and a battery container that is capable of holding the electrode assembly and electrolytic solution. The liquid activated air battery also includes: a supply tank for the electrolytic solution to be supplied to the battery container; a drainage tank for the electrolytic solution discharged from the battery container; and an electrolytic solution flow mechanism that runs the electrolytic solution from the supply tank to the drainage tank through the battery container in one direction, wherein the supply tank and the drainage tank are expandable and shrinkable, whereby a conventional problem is solved.

According to a preferred embodiment of the liquid activated air battery, the electrolytic solution flow mechanism further includes at least one of: a pressurizing means that pumps the electrolytic solution from the supply tank to the battery container; and a depressurizing means that suctions the electrolytic solution from the supply tank to the battery container.

The composition of the electrolytic solution supplied to the battery is kept constant by virtue of the above-described structure, whereby the liquid activated air battery according to the present invention provides stable power output. Also, downsizing and weight reduction are achieved compared to one using circulated electrolytic solution.

BRIEF DESCRIPTION OF THE DRAWINGS

The description herein makes reference to the accompanying drawings wherein like reference numerals refer to like parts throughout the several views, and wherein.

DESCRIPTION OF THE EMBODIMENTS

Figure 1A:
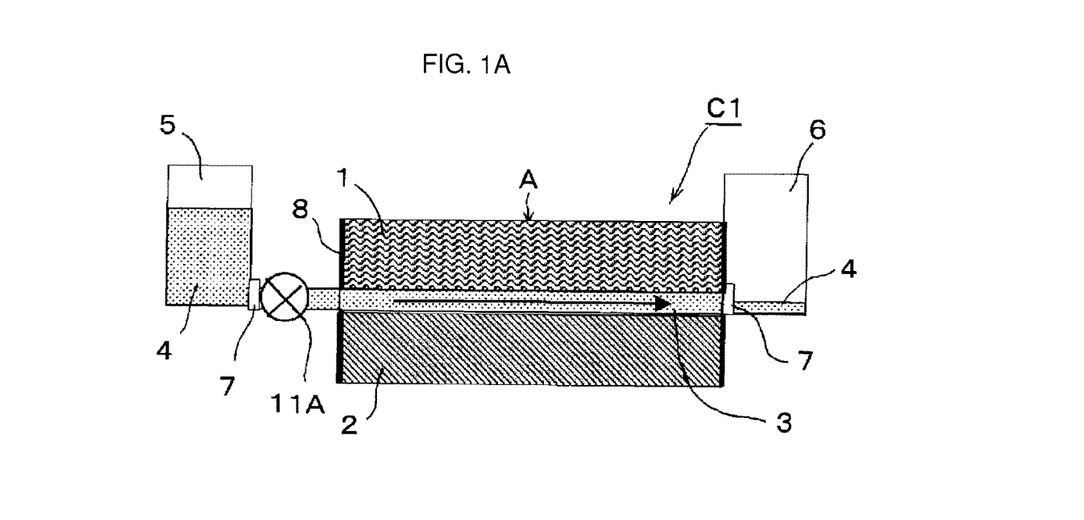
FIGS. 1A and 1B are cross sectional views showing a liquid activated air battery according to an embodiment of the present invention, provided with an electrolytic solution flow mechanism that is, in FIG. 1A, a pressurizing means or, in FIG. 1B, a depressurizing means.
Figure 1B:
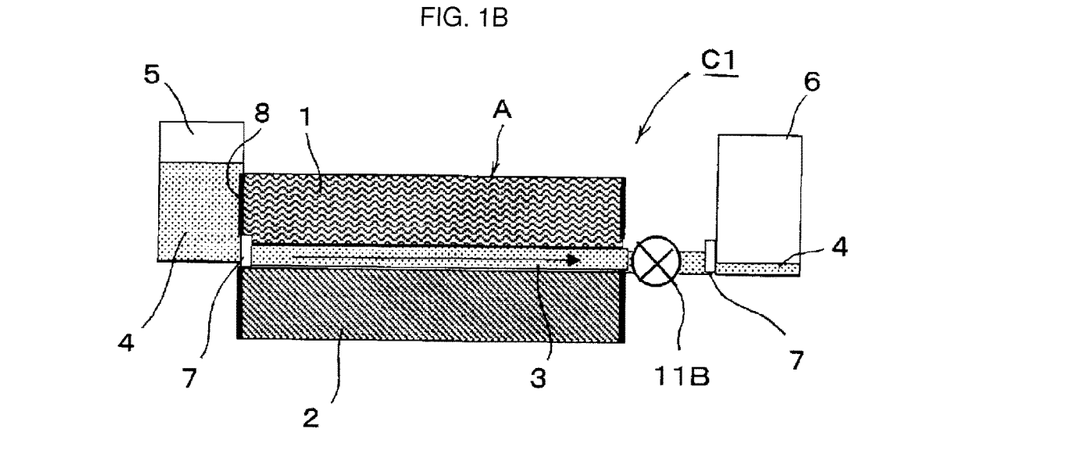

A liquid activated air battery C1 shown in FIGS. 1A and 1B includes an electrode assembly A in which a separator 3 is disposed between an air electrode (cathode) 1 and a metal anode 2, a battery container 8 that is capable of holding the electrode assembly A and electrolytic solution 4, a supply tank 5 for the electrolytic solution 4 to be supplied to the battery container 8, and a drainage tank 6 for the electrolytic solution 4 discharged from the battery container 8. The electrode assembly A of the embodiment shown in the figure is a laminate having a planar shape such as rectangle or circle. The supply tank 5 is disposed at one end (left side in FIGS. 1A and 1B) of the electrode assembly A, and the drainage tank 6 is disposed at the other end.

The liquid activated air battery C1 also includes check valves 7 and 7 that allow flow in the direction from the supply tank 5 to drainage tank 6, being disposed respectively between the supply tank 5 and battery container 8 and between the battery container 8 and drainage tank 6. In the embodiment shown in the figure, the check valves 7 and 7 are respectively disposed at an outlet of the supply tank 5 and at an inlet of the drainage tank 6. However, the check valves 7 may be disposed at a piping in which the electrolytic solution 4 flows.

The above-described liquid activated air battery C1 also includes an electrolytic solution flow mechanism that runs the electrolytic solution 4 from the supply tank 5 to the drainage tank 6 through the battery tank 8 in one direction. The electrolytic solution flow mechanism includes at least one of a pressurizing means that supplies the battery container 8 with the electrolytic solution 4 from the supply tank 5 by pressure and a depressurizing means that supplies the battery container 8 with the electrolytic solution 4 from the supply tank 5 by suction.

Specifically, as the pressurizing means, the liquid activated air battery C1 includes a pressure pump 11A that is disposed between the supply tank 5 and the battery container 8 as shown in FIG. 1A. Alternatively, as the depressurizing means, the liquid activated air battery C1 includes a suction pump 11B that is disposed between the battery container 8 and the drainage tank 6 as shown in FIG. 1B. It is also possible to provide both of the pressure pump 11A (pressurizing means) and the suction pump 11B (depressurizing means).

The air electrode 1 is composed of a cathode and a liquid tight/gas permeable member disposed at the outermost layer, which are not shown in the figure. The cathode includes, for example, a catalyst and a conductive catalyst carrier that supports the catalyst.

Specifically, the catalyst may be selected from metals such as platinum (Pt), ruthenium (Ru), iridium (Ir), rhodium (Rh), palladium (Pd), osmium (Os), tungsten (W), lead (Pd), iron (Fe), chromium (Cr), cobalt (Co), nickel (Ni), manganese (Mn), vanadium (V), molybdenum (Mo), gallium (Ga) and aluminum (Al), an alloy of these metals, and the like. The catalyst is not particularly limited regarding its shape and size, and the shapes and sizes of conventionally known catalysts may be employed. It is however preferable that the catalyst has a granular shape. The catalyst particles preferably have an average particle size of 1 to 30 nm. If the catalyst particles have an average particle size within this range, it is possible to correctly control the balance between ease of support and the catalyst utilization ratio, which relates to the effective electrode area where an electrochemical reaction occurs.

The catalyst carrier functions as a carrier that supports the above-described catalyst, and also functions as an electron transfer path, which is involved in transfer of electrons between the catalyst and the other members. The catalyst carrier is only required to have large specific surface area enough to support the catalyst in a desired dispersed condition and to have sufficient electron conductivity. Carbon is its preferable main ingredient. Specifically, the catalyst carrier may be carbon particles that are composed of carbon black, activated carbon, coke, natural or artificial graphite, or the like. The catalyst carrier is not particularly limited regarding its size, but the average particle size is preferably 5 to 200 nm, more preferably 10 to 100 nm in terms of controlling the ease of support, catalyst utilization ratio, thickness of a catalyst layer and the like to be within suitable ranges.

In the cathode, the amount of the catalyst is preferably 10 to 80 wt %, more preferably 30 to 70 wt % with respect to the total amount of the electrode catalyst. However, it is not limited thereto and any conventionally-known materials that are used in air batteries may be employed.

The liquid tight/gas permeable member has liquid (water) tightness against the electrolyte solution 4, but has gas permeability to oxygen. The liquid tight/gas permeable member is composed of water repellent film of polyolefin, fluororesin or the like, so as to prevent the electrolytic solution 4 from leaking out, and has many micropores so that oxygen can be supplied to the cathode.

The metal anode 2 contains an anode active material that is composed of a simple substance or alloy of base metal, which has a lower normal electrode potential than hydrogen. The simple substance of base metal having a lower normal electrode potential than hydrogen may be, for example, zinc (Zn), iron (Fe), aluminum (Al), magnesium (Mg), manganese (Mn), silicon (Si), titanium (Ti), chromium (Cr), vanadium (V), or the like. The alloy thereof may be, for example, such metal added with one or more of other metals or nonmetal elements. However, it is not limited thereto, and any conventionally known materials that are used in air batteries may be employed.

The separators 3 may be, for example, glass paper without water repellent finish, porous film of polyolefin such as polyethylene and polypropylene, or the like. However, it is not limited thereto, and any conventionally known materials that are used in air batteries may be employed.

The electrolytic solution 4 may be, for example, aqueous solution of potassium chloride, sodium chloride, potassium hydroxide or the like. However, it is not limited thereto, and any conventionally known electrolytic solutions that are used in air batteries may be employed. The amount of the electrolytic solution 4 is determined in consideration of the discharge duration of the liquid activated air battery C1, amount of metal salt deposited during discharge, total void volume of the separators 3, amount of flow required to maintain a certain composition and the like.

The battery container 8 holds the electrode assembly A and electrolytic solution 4, and maintains liquid-tightness of the electrode assembly A at least at the outer periphery so as to prevent the electrolytic solution from leaking out. The battery container 8 may be a case that is separated from the electrode assembly A, an outer frame that composes the outer periphery of the electrode assembly A, or the like.

In the liquid activated air battery C1 with the above-described structure, the battery container 8 is filled with the electrolytic solution 4 in the initial state as shown in the figure. In this case, it is required to cut off oxygen supply to the air electrode 1 by gas-tightly sealing the battery container 8 or by covering the air electrode 1 with a gas-tight sheet, in order to prevent the self-discharge. The initial filled amount of the electrolytic solution 4 is nearly equal to the total void volume of the air electrode 1 including the separator 3.

At the startup of the liquid activated air battery C1, the air electrode 1 is opened and the electrolytic solution 4 in the supply tank 5 is supplied to the battery container 8. Specifically, in the liquid activated air battery C1 shown in FIG. 1A, the pressure pump 11A is driven to create pressure, and the electrolytic solution 4 is thus supplied to the battery container 8 from the supply tank 5 by the pressure. The electrolytic solution 4 filled in the battery container 8 is accordingly pushed out and discharged to the drainage tank 6.

In the liquid activated air battery C1 shown in FIG. 1B, the suction pump 11B is driven to create negative pressure, and the electrolytic solution 4 is thus supplied to the battery container 8 from the supply tank 5 by suction. The electrolytic solution 4 in the battery container 8 is accordingly discharged to the drainage tank 6. The electrolytic solution 4 may be supplied continuously or intermittently, and the amount of the supply per unit time may be constant or variable.

As described above, in the liquid activated air battery C1, the electrolytic solution 4 flows in one direction along a path from the supply tank 5 to the drainage tank 6 through the battery container 8. Thus, deposits (metal salt) that are produced during the discharge are rapidly discharged to the drainage tank 6, and the battery container 8 is always supplied with fresh electrolytic solution 4 having a constant composition, which ensures stable power output of the liquid activated air battery C1.

In the liquid activated air battery C1, the check valves 7 and 7 are disposed between the supply tank 5 and battery container 8 and between the battery container 8 and drainage tank 6. The electrolytic solution 4 is thus prevented from backflow, which maintains the composition of the electrolytic solution 4 in the battery container 8 well.

Comparing to the conventional air batteries in which electrolytic solution is filtered and circulated, the liquid activated air battery C1 does not include a filter, and is thus free from problems of the deposits clogging the filter, and the like, whereby greatly simplified structure, downsizing and weight reduction are achieved.

Figure 2A:
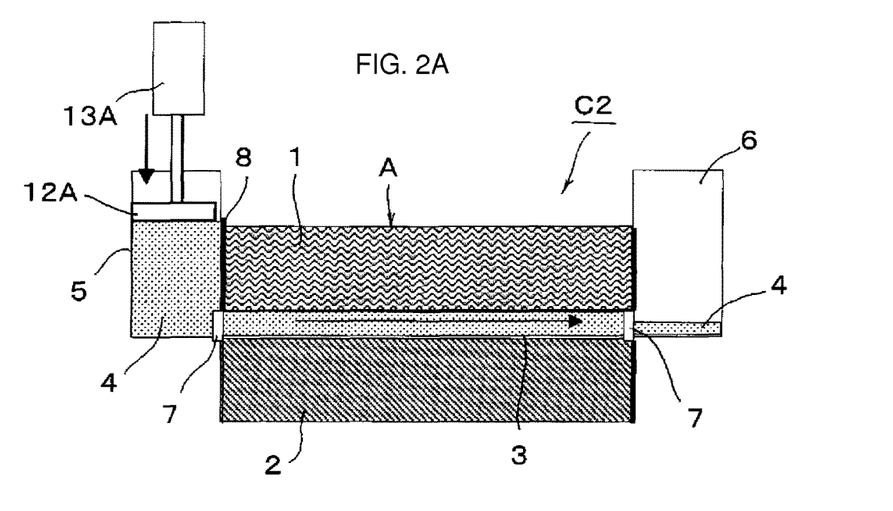
FIGS. 2A and 2B are cross sectional views showing a liquid activated air battery according to another embodiment of the present invention, provided with an electrolyte flow mechanism that is, in FIG. 2A, a pressurizing means or, in FIG. 2B, a depressurizing means.
Figure 2B:
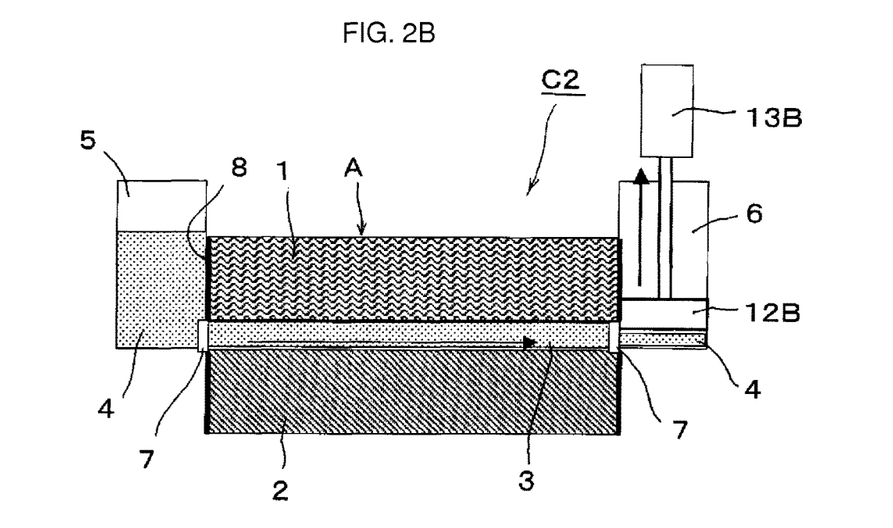

FIGS. 2A and 2B are views to describe a liquid activated air battery according to another embodiment of the present invention. In the following embodiments, the same components as in the foregoing embodiment shown in FIGS. 1A and 1B are represented by the same reference signs, and the detailed descriptions are omitted.

A liquid activated air battery C2 shown in the figure includes an electrode assembly A in which a separator 3 is disposed between an air electrode 1 and a metal anode 2, a battery container 8 that accommodates and holds the electrode assembly A and electrolytic solution 4, and a supply tank 5 and a drainage tank 6 for the electrolytic solution 4. The liquid activated air battery C2 also includes an electrolytic solution flow mechanism that includes at least one of a pressurizing means that supplies the battery container 8 with the electrolytic solution 4 from the supply tank 5 by pressure and a depressurizing means that supplies the battery container 8 with the electrolytic solution 4 from the supply tank 5 by suction.

Specifically, as the pressurizing means, the liquid activated air battery C2 includes a piston 12A that is movably disposed inside the supply tank 5 and an actuator 13A to drive the piston as shown in FIG. 2A. The actuator 13A pushes the piston 12A in the direction (downward in FIGS. 2A and 2B) decreasing the volume of the space for the electrolytic solution in the supply tank 5. The pressurizing means thus pressurizes electrolytic solution 4 in the supply tank 5, and supplies the battery container 8 with it by the pressure.

Alternatively, as the depressurizing means, the liquid activated air battery C2 includes a piston 12B that is movably disposed inside the drainage tank 6 and an actuator 13B to drive the piston as shown in FIG. 2B. The actuator 13B pulls the piston 12B in the direction (upward in FIGS. 2A and 2B) increasing the volume of the space for the electrolytic solution in the drainage tank 6 to create negative pressure. The depressurizing means thus supplies the battery container 8 with the electrolytic solution 4 from the supply tank 5 by suction.

As with the foregoing embodiment, the battery container 8 is always supplied with fresh electrolytic solution 4 having a constant composition, and the deposits are discharged from the battery container 8, which ensures stable power output of the liquid activated air battery C2. Also, lower cost and higher reliability are achieved compared to one using a pump, as well as simplified structure, downsizing and weight reduction.

The actuators 13A and 13B are not particularly limited in the above-described embodiment. However, if they require working fluid like cylinders, for example, the structure tends to be complicated because of the various devices including a fluid source. It is thus preferable to employ an integrated combination of a motor and a mechanism that converts its rotation to linear motion.

Figure 3A:
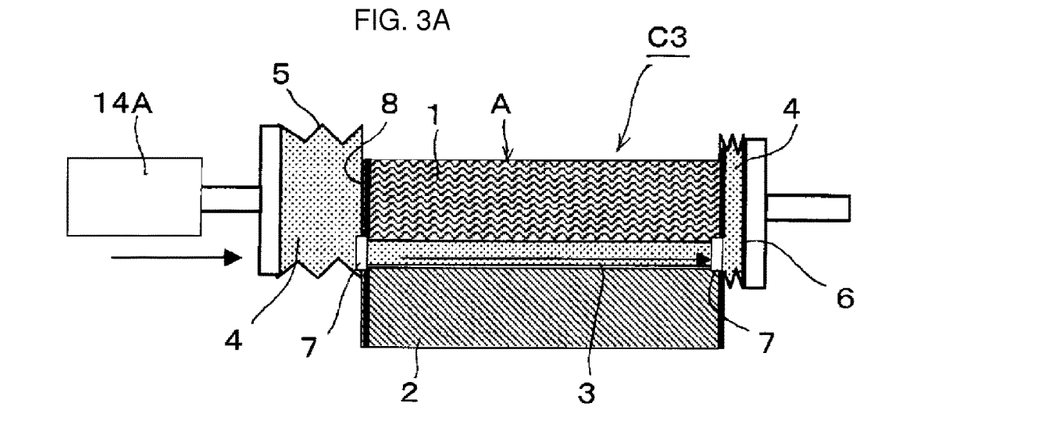
FIGS. 3A and 3B are cross sectional views showing a liquid activated air battery according to a further embodiment of the present invention, provided with an electrolytic solution flow mechanism that is provided with, in FIG. 3A, a pressurizing means or in FIG. 3B, a depressurizing means.
Figure 3B:
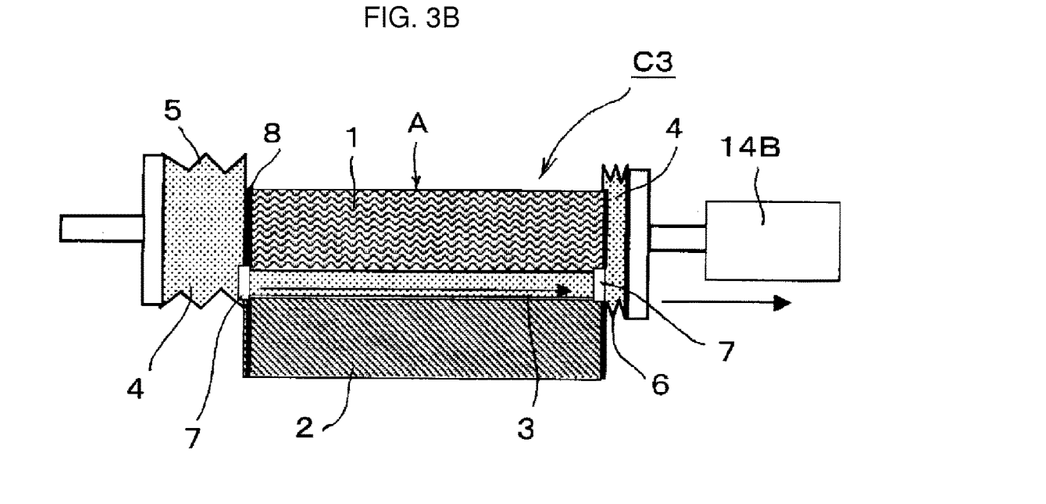

A liquid activated air battery C3 shown in FIGS. 3A and 3B includes an electrode assembly A in which a separator 3 is disposed between the air electrode 1 and a metal anode 2, a battery container 8 that accommodates and holds the electrode assembly A and electrolytic solution 4, and a supply tank 5 and a drainage tank 6 for the electrolytic solution 4. Both of the supply tank 5 and the drainage tank 6 are shrinkable and expandable. Specifically, they are bellows that are shrinkable and expandable in the in-plane direction of the electrode assembly A (direction along the plane that is the crosswise direction in the figures).

The material of the supply tank 5 and the drainage tank 6 is not particularly limited, and may be made of, for example, one or more of polyethylene (PE), polypropylene (PP), polyvinyl chloride (PVC), polyamide and polyethylene terephthalate (PET).

The liquid activated air battery C3 includes an electrolytic solution flow mechanism that includes at least one of a pressurizing means that supplies the battery container 8 with the electrolytic solution 4 from the supply tank 5 by pressure and a depressurizing means that supplies the battery container 8 with the electrolytic solution 4 from the supply tank 5 by suction.

Specifically, as the pressurizing means, the liquid activated air battery C3 includes an actuator 14A that shrinks the supply tank 5 as shown in FIG. 3A. The actuator 14A pushes the supply tank 5 in the shrinking direction (left to right direction in FIGS. 3A and 3B). The pressurizing means thus pressurizes the electrolytic solution 4 in the supply tank 5, and supplies the battery container 8 with it by the pressure.

Alternatively, as the depressurizing means, the liquid activated air battery C3 includes an actuator 14B that expands the drainage tank 6 as shown in FIG. 3B. The actuator 14B pulls the drainage tank 6 in the expanding direction (left to right direction in the FIGS. 3A and 3B) to create negative pressure. The depressurizing means thus supplies the battery container 8 with the electrolytic solution 4 from the supply tank 5 by suction.

As with the foregoing embodiments, the battery container 8 is always supplied with fresh electrolytic solution 4 having a constant composition, and the deposits are discharged from the battery container 8, which ensures stable power output of the liquid activated air battery C3. Also, lower cost and higher reliability are achieved compared to one using a pump, as well as simplified structure, downsizing and weight reduction. Furthermore, since the supply tank 5 and the drainage tank 6 expand or shrink themselves, it is advantageous that the electrolytic solution 4 is kept sealed and do not contact the other components.

Figure 4:
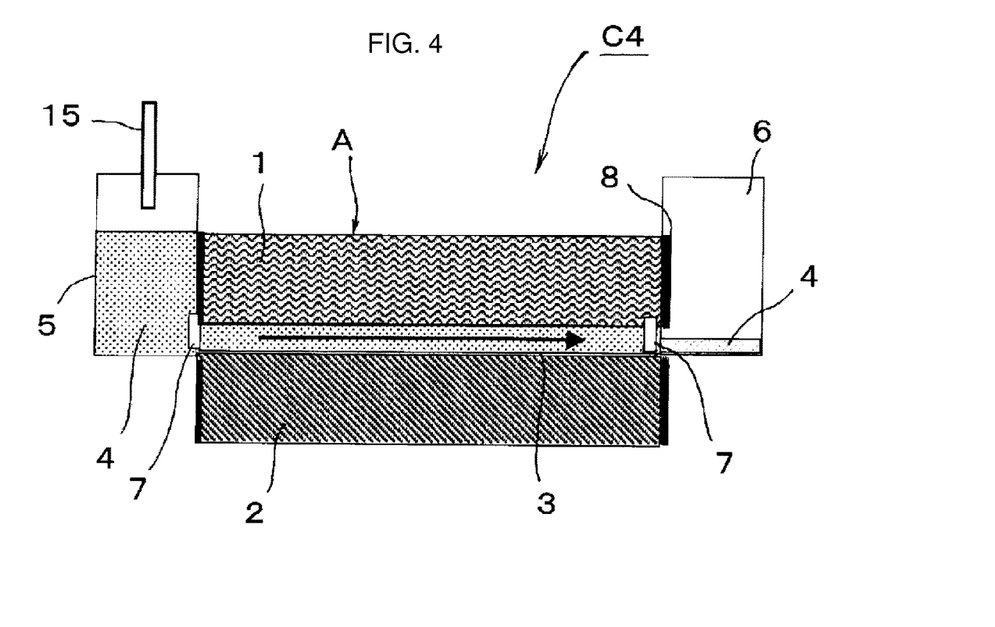
FIG. 4 is a cross sectional view to describe a liquid activated air battery according to a further embodiment of the present invention.

A liquid activated air battery C4 shown in FIG. 4 includes an electrode assembly A in which a separator 3 is disposed between an air electrode 1 and a metal anode 2, a battery container 8 that accommodates and holds the electrode assembly A and electrolytic solution 4, and a supply tank 5 and a drainage tank 6 for the electrolytic solution 4. The liquid activated air battery C4 also includes an electrolytic solution flow mechanism that includes a pressurizing means to supply the battery container 8 with the electrolytic solution 4 from the supply tank 5 by pressure.

Specifically, as the pressurizing means, the liquid activated air battery C4 includes a means that supplies the supply tank 5 with pressurizing gas. More specifically, it includes a gas source (not shown) and a gas supply pipe 15 that is inserted in the supply tank 5. The pressurizing means supplies the supply tank 5 with the pressurizing gas, and the electrolytic solution 4 is thus pressurized and supplied to the battery container 8 from the supply tank 5 by the pressure.

As with the foregoing embodiments, the battery container 8 is always supplied with fresh electrolytic solution 4 having a constant composition, and the deposits are discharged from the battery container 8, which ensures stable power output of the liquid activated air battery C4. Also, lower cost and higher reliability compared to one using a pump are achieved, as well as simplified structure, downsizing and weight reduction.

The liquid activated air battery C4 of the above-described embodiment may include a depressurizing means, for example, one that suctions and discharges the interior of the drainage tank 6 to create negative pressure, and the electrolytic solution 4 is thus supplied to the battery container 8 from the supply tank 5 by suction. In this case, however, some sort of measure is required in order to prevent the electrolytic solution 4 from flowing into the suction system of the depressurizing means. Thus, one with the pressurizing means has a simpler structure like the above-described embodiment.

Figure 5:
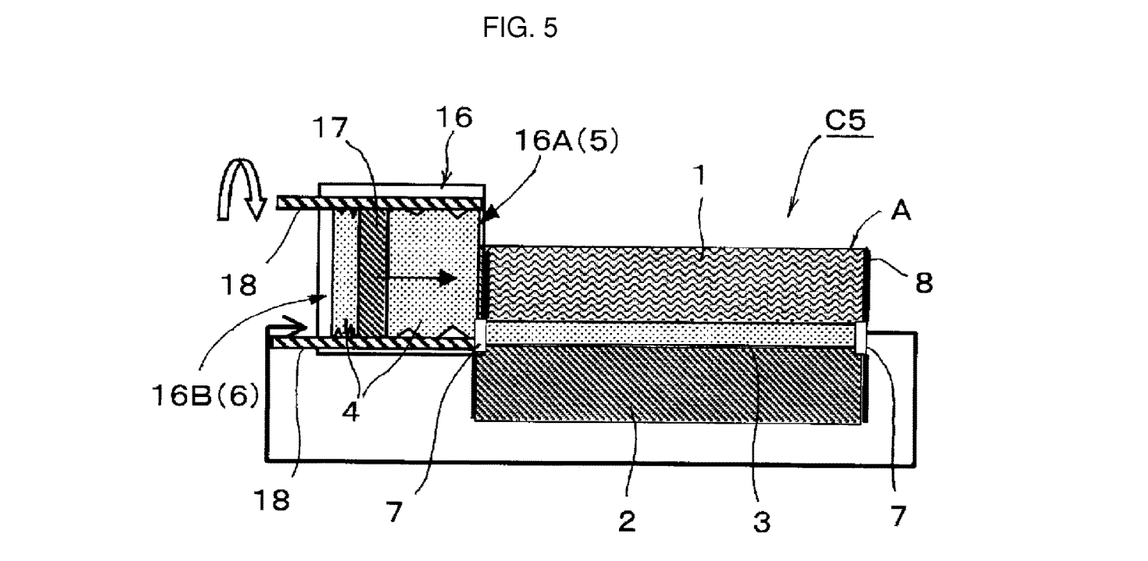
FIG. 5 is a cross sectional view to describe a liquid activated air battery according to a further embodiment of the present invention.

A liquid activated air battery C5 shown in FIG. 5 includes an electrode assembly A in which a separator 3 is disposed between the air electrode 1 and a metal anode 2, a battery container 8 that accommodates and holds the electrode assembly A and electrolyte solution 4. As an electrolytic solution flow mechanism, it also includes an electrolytic solution tank 16, a piston 17 that is disposed inside the electrolytic solution tank 16 and a drive unit of the piston 17.

The piston 17 of the embodiment shown in the figure is disposed inside the electrolytic solution tank 16 movably in the crosswise direction. The drive unit includes a pair of screw shafts 18 and 18 that are engaged with the piston 17, in which a motor (not shown) rotates the screw shafts 18 to move the piston 17.

The above-described electrolytic solution flow mechanism defines first and second pressure rooms 16A and 16B on each side of the piston 17 inside the electrolytic solution tank 16, the volumes of which change inversely to each other along with the movement of the piston 17. The first pressure room 16A works as a supply tank (5) for the electrolytic solution 4, and the second pressure room 16B as a drainage tank (6) for the electrolytic solution 4.

That is, the liquid activated air battery C5 includes the electrolytic solution flow mechanism in which a pressurizing means and depressurizing means are integrated with each other. The drive unit moves the piston 17 with the screw shafts 18 to decrease the volume of the first pressure room 16A (supply tank 5), and the electrolytic solution 4 is thus pressurized and supplied to the battery container 8 by the pressure. At the same time, the volume of the second pressure room 16B (drainage tank 6) is increased to create negative pressure, and the electrolytic solution 4 is thus supplied to the battery container 8 by suction.

As with the foregoing embodiments, the battery container 8 is always supplied with fresh electrolytic solution 4 having a constant composition, and the deposits are discharged from the battery container 8, which ensures stable power output of the liquid activated air battery C5. Also, lower cost and higher reliability compared to one using a pump are achieved as well as simplified structure, downsizing and weight reduction. Furthermore, the number of the tanks for the electrolytic solution 4 is substantially reduced to one (electrolytic solution tank 16), and the electrolytic solution flow mechanism includes both of the pressurizing means and depressurizing means that are integrated with each other, whereby improved supply performance of the electrolytic solution 4 and a more compact structure are achieved.

Figure 6:
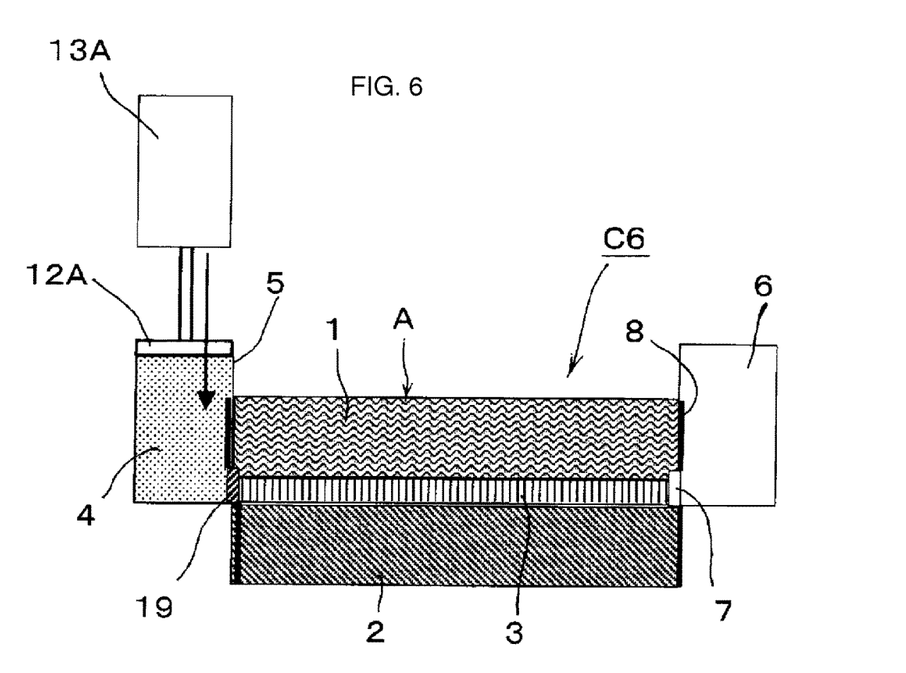
FIG. 6 is a cross sectional view to describe a liquid activated air battery according to a further embodiment of the present invention.

A liquid activated air battery C6 shown in FIG. 6 includes an electrode assembly A in which a separator 3 is disposed between an air electrode 1 and a metal anode 2, a battery container 8 that accommodates and holds the electrode assembly A and electrolytic solution 4, and a supply tank 5 and a drainage tank 6 for the electrolytic solution 4. The liquid activated air battery C6 also includes an electrolytic solution flow mechanism that includes a pressurizing means to supply the battery container 8 with the electrolytic solution 4 from the supply tank 5 by pressure. As with the embodiment shown in FIG. 2, the pressurizing means of this embodiment includes a piston 12A that is movably disposed inside the supply tank 5 and an actuator 13A to drive the piston.

The electrolytic solution 4 is provided only in the supply tank 5 at the initial state, and the liquid activated air battery C6 includes an on-off valve 19 between the supply tank 5 and battery container 8. A check valve 7, which is the same as one in each of the foregoing embodiments, is disposed between the battery container 8 and the drainage tank 6.

The liquid activated air battery C6 is an immersion-type liquid activated air battery, in which the battery container 8 is not injected with the electrolytic solution 4 at the initial state. Thus, it is not required to cut off oxygen supply to the air electrode 1. At the startup of the liquid activated air battery C6, the on-off valve 19 is opened, and the actuator 13A pushes the piston 12A. The electrolytic solution 4 is thus pressurized and supplied to the battery container 8 from the supply tank 5 by the pressure.

As with the foregoing embodiments, the battery container 8 is always supplied with fresh electrolytic solution 4 having a constant composition, and the deposits are discharged from the battery container 8, which ensures stable power output of the liquid activated air battery C6. Also, self-discharge before use is prevented by the simple structure using the on-off valve 19, whereby long storage life is achieved as well as a simplified structure, downsizing and weight reduction.

Instead of the on-off valve 19, the liquid activated air battery C6 may include a self-open valve that opens at a predetermined pressure or a closure that cleaves at a predetermined pressure. In this case, the self-open valve or closure opens (or cleavages) by itself when the pressurizing means pressurizes the electrolytic solution 4. Thus, it is not required to operate the valve to open it, and more simplified structure is achieved, which contributes to the reduction of manufacturing costs and the like.

Figure 7:
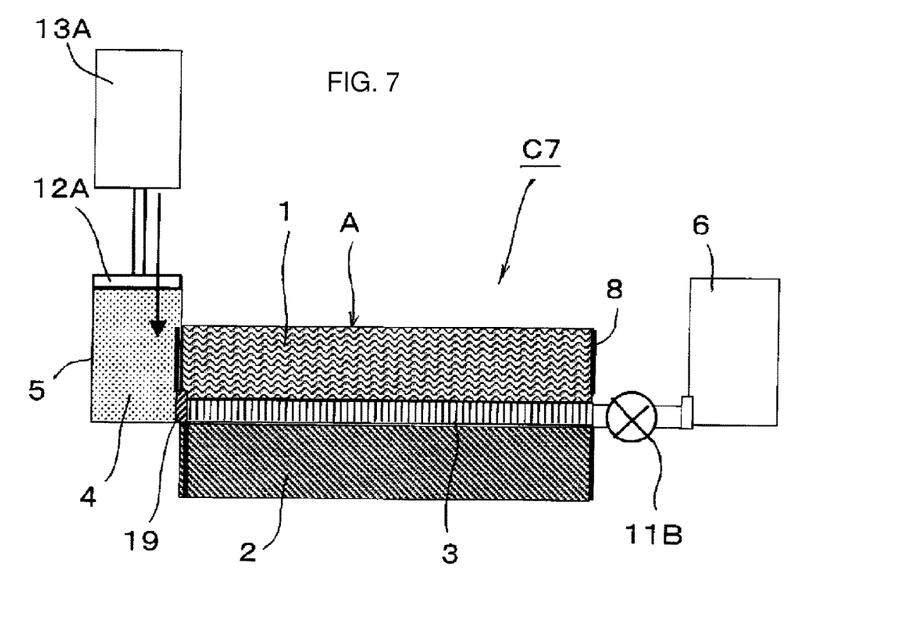
FIG. 7 is a cross sectional view to describe a liquid activated air battery according to a further embodiment of the present invention.

A liquid activated air battery C7 shown in FIG. 7 includes an electrode assembly A in which a separator 3 is disposed between an air electrode 1 and a metal anode 2, a battery container 8 that accommodates and holds the electrode assembly A and electrolytic solution 4, and a supply tank 5 and a drainage tank 6 for the electrolytic solution 4. The liquid activated air battery C7 also includes an electrolytic solution flow mechanism that includes both of a pressurizing means that supplies the battery container 8 with the electrolytic solution 4 from the supply tank 5 by pressure and a depressurizing means that supplies the battery container 8 with the electrolytic solution 4 from the supply tank 5 by suction.

As with the embodiment shown in FIG. 2, the pressurizing means of this embodiment includes a piston 12A that is movably disposed inside the supply tank 5 and an actuator 13A to drive the piston. The depressurizing means includes, as with the embodiment shown in FIG. 1, a suction pump 11B that is disposed between the battery container 8 and drainage tank 6.

As with the embodiment shown in FIG. 6, the electrolytic solution 4 is provided only in the supply tank 5 at the initial state, and the liquid activated air battery C7 includes an on-off valve 19 that is disposed between the supply tank 5 and the battery container 8. As with the foregoing embodiments, a check valve 7 is disposed between the battery container 8 and drainage tank 6.

At the startup of the liquid activated air battery C7, the on-off valve 19 is opened, and at least one of the pressurizing means and depressurizing means is put into operation, so that the electrolytic solution 4 is supplied to the battery container 8. If the pressurizing means is used, the actuator 13A pushes the piston 12A, and the electrolytic solution 4 is thus pressurized and supplied to the battery container 8 from the supply tank 5 by the pressure. Alternatively, if the depressurizing means is used, the suction pump 11B is put into operation to create negative pressure, and the electrolytic solution 4 is thus supplied to the battery container 8 from the supply tank 5 by suction.

As with the foregoing embodiments, the battery container 8 is always supplied with fresh electrolytic solution 4 having a constant composition, and the deposits are discharged from the battery container 8, which ensures stable power output of the liquid activated air battery C7. Also, self-discharge before use is prevented by the simple structure using the on-off valve 19, whereby long storage life is achieved as well as simplified structure, downsizing and weight reduction.

Since the liquid activated air battery C7 includes the on-off valve 19 and suction pump 11B as the depressurizing means, the electrolytic solution 4 is suctioned and discharged to the drainage tank 6 from the battery container 8 by operating the suction pump 11B with the on-off valve 19 being closed. It is thus possible to halt the discharge by putting the electrode assembly A into dry condition.

Figure 8:
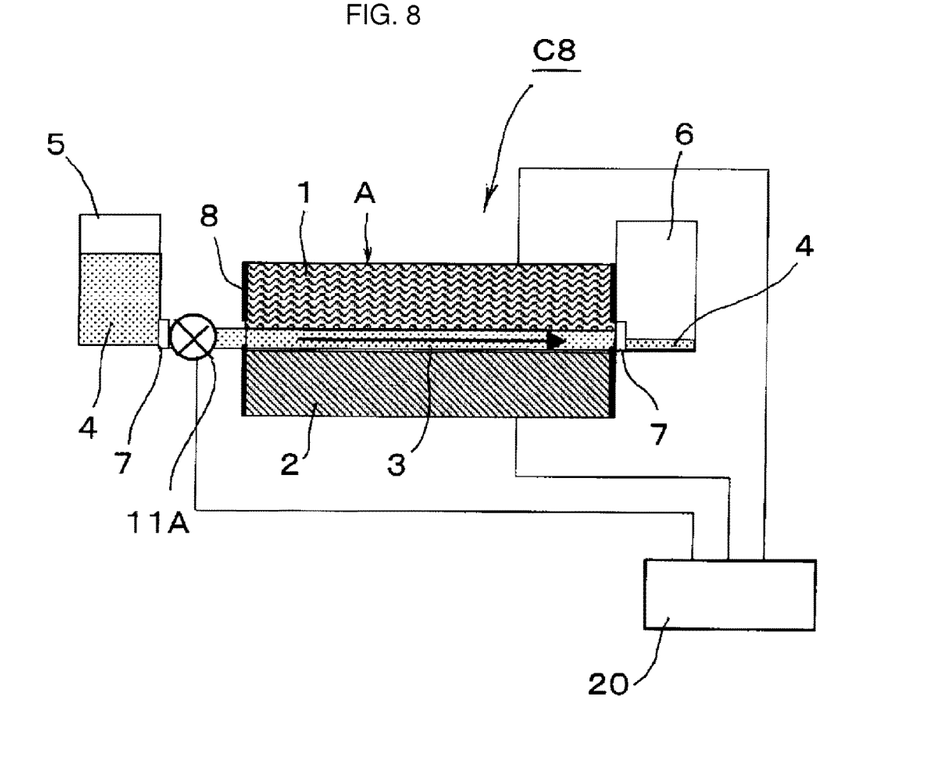
FIG. 8 is an explanatory cross sectional view to describe a liquid activated air battery according to a further embodiment of the present invention.

A liquid activated air battery C8 shown in FIG. 8 includes the same basic components as the embodiment shown in FIG. 1(A), and further includes a controller 20 that controls the supply of the electrolytic solution 4 to the battery container 8 according to a status parameter of the electrode assembly A and/or the electrolytic solution 4 during the discharge. Specifically, the controller 20 operates the electrolytic solution flow mechanism (pressurizing means and/or depressurizing means) so as to control the supply of the electrolytic solution 4 to the battery container 8. In this embodiment, the controller 20 operates a pressure pump 11A to control the supply of the electrolytic solution 4.

In the liquid activated air battery C8, the status parameter of the electrode assembly A is discharge current of the electrode assembly A. That is, the compositional change of the electrolytic solution 4 is roughly proportional to the quantity of electricity (Coulomb, C). In order to eliminate the compositional change of the electrolytic solution 4, it is only required to change the supply rate of the electrolytic solution 4 per unit time (L/sec) according to the discharge current. The supply rate is given by the following equation.

Supply rate (L/sec)=Discharge current (A)/Design discharge capacity (A·sec)×Initial electrolytic solution amount in tank (L)

In the liquid activated air battery C8, the supply of the electrolytic solution 4 to the battery container 8 is controlled in such a way that the discharge current of the electrolytic assembly A is detected, and the controller 20 operates the pressure pump 11A according to the detected value. In other words, the controller 20 controls the operation of the pressure pump 11A, so that the supply of the electrolytic solution 4 changes according to the detected current discharge value. Thus, in the liquid activated air battery C8, the composition of the electrolytic solution 4 in the battery container 8 is always kept constant, whereby the performance of the battery is maintained well.

Figure 9:
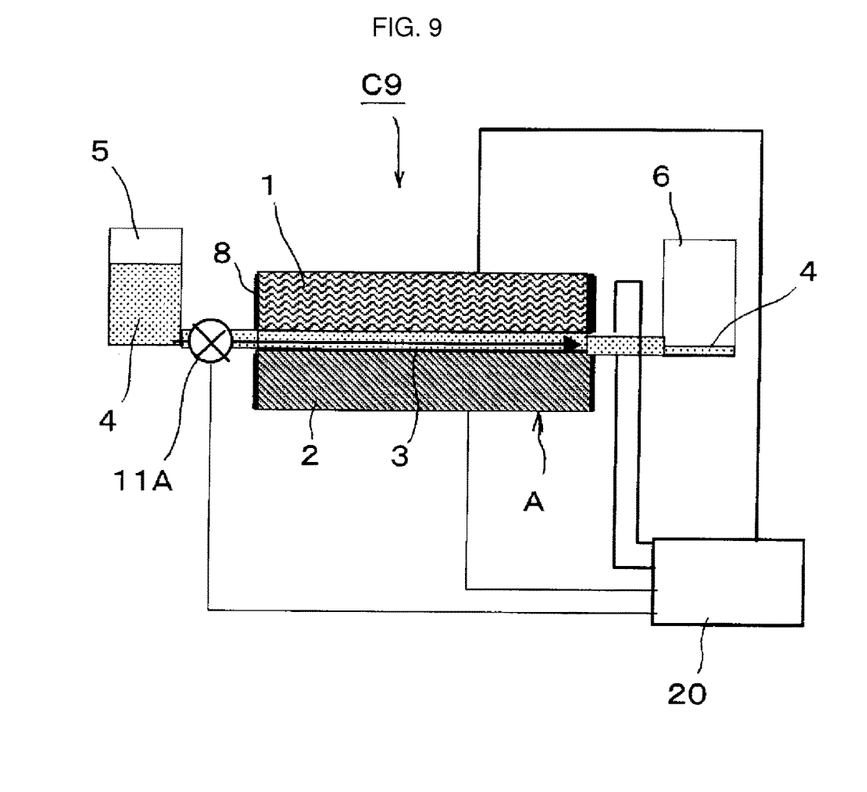
FIG. 9 is an explanatory cross sectional view to describe a liquid activated air battery according to a further embodiment of the present invention.

A liquid activated air battery C9 shown in FIG. 9 includes the same basic components as the embodiment shown in FIG. 1(A), and further includes a controller 20 that controls the supply of the electrolytic solution 4 to the battery container 8 according to status parameters of the electrode assembly A and/or electrolytic solution 4 during the discharge.

In the liquid activated air battery C9 of this embodiment, the status parameters of the electrode assembly A and the electrolytic solution 4 are internal resistance of the electrode assembly A and resistance of the electrolytic solution 4 discharged from the battery container 8. That is, since the characteristics of the electrolytic solution 4 is represented by its resistance, it is possible to figure out the compositional change of the electrolytic solution 4 by detecting at least one of the internal resistance of the electrode assembly A and the resistance of the discharged electrolytic solution 4.

In this embodiment, the internal resistance of the electrode assembly A and the resistance of the discharged electrolytic solution 4 are detected, and the controller 20 controls the supply of the electrolytic solution 4 to the battery container 8 based on the detected values. More specifically, the controller 20 operates the pressure pump 11A to control the supply of the electrolytic solution 4, so that the internal resistance of the electrode assembly A and the resistance of the electrolytic solution 4 are kept at constant values or in predetermined ranges.

The internal resistance ($\Omega$) of the electrode assembly A is given as the product of the current change $\Delta I$ (A) and voltage change $\Delta V$ (V). When the resistance of the electrode assembly A is used, for example, upper and lower limits of the resistance may be preset. The supply of the electrolytic solution 4 starts when the resistance reaches the upper limit, and the supply of the electrolytic solution 4 stops when it reaches the lower limit.

When the resistance of the electrolytic solution 4 is used, upper and lower limits of the resistance may be preset similarly, although the actual values vary depending on the material of the electrolytic solution 4. The supply of the electrolytic solution 4 starts when the resistance reaches the lower limit, and the supply of the electrolytic solution 4 stops when it reaches the upper limit.

In this way, in the liquid activated air battery C9, the composition of the electrolytic solution 4 in the battery container 8 is always kept constant as with the foregoing embodiment, whereby the performance of the battery is maintained well.

In the embodiments shown in FIGS. 8 and 9, which are provided with the controller 20 that controls the supply of the electrolytic solution 4 to the battery container 8 according to the status parameter of the electrode assembly A or the electrolytic solution 4, the status parameter also may be density of the electrolytic solution 4 discharged from the battery container 8. In this case, a float densitometer or vibration hydrometer is provided at an outlet of the battery container 8 of the electrode assembly A.

The density of the electrolytic solution 4 is detected, and the controller 20 controls the supply of the electrolytic solution 4 to the battery container 8 based on the detected value. Upper and lower limits of the density are preset similarly to the resistance, although the actual values vary depending on the material of the electrolytic solution 4. The supply of the electrolytic solution 4 starts when the density reaches the upper limit, and the supply of the electrolytic solution 4 stops when it reaches the lower limit. Thus, as with the foregoing embodiments, the composition of the electrolytic solution 4 in the battery container 8 is always kept constant, whereby the performance of the battery is well maintained.

Figure 10:
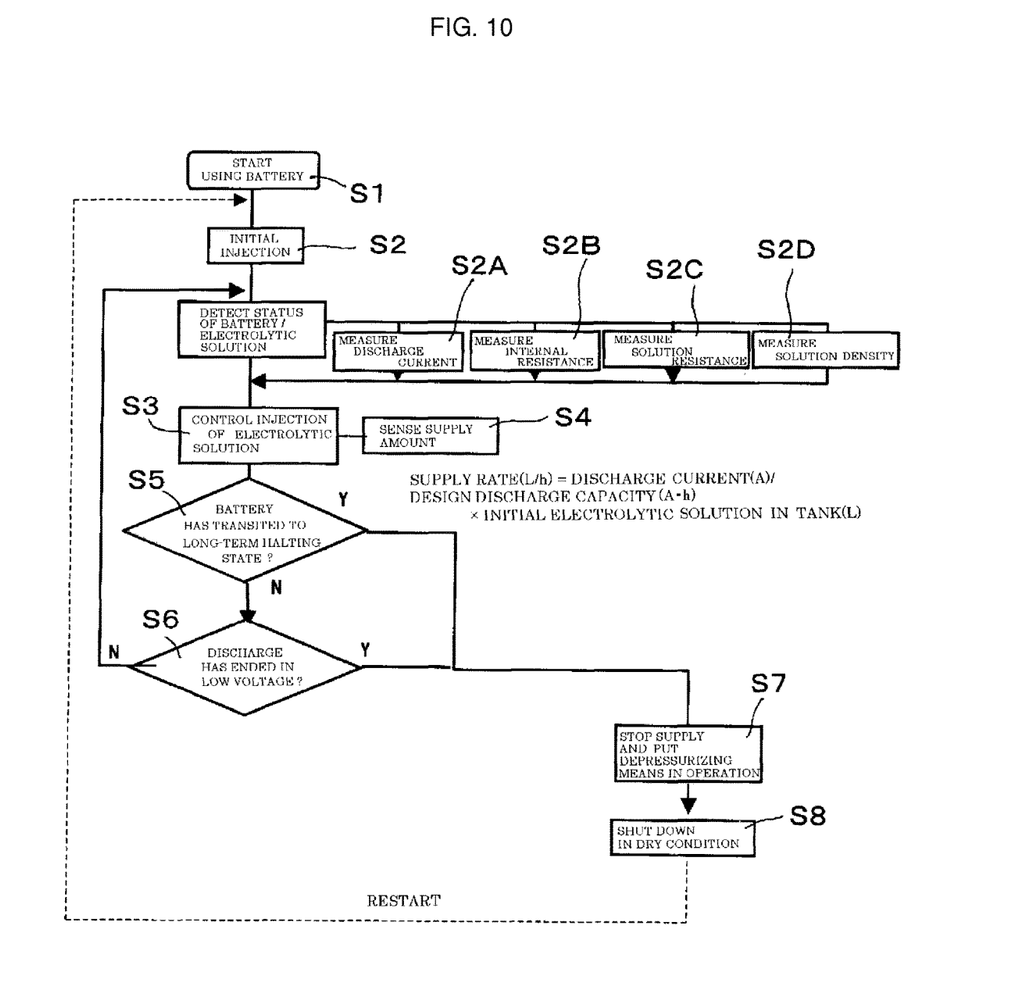
FIG. 10 is a flowchart showing a control process by a controller of the liquid activated air battery shown in FIGS. 7 and 8.

FIG. 10 is a flowchart to describe a control process of the controller of the liquid activated air battery. When the battery starts to be used, the electrolytic solution is initially supplied (injected) at step S1, and the statuses of the electrode assembly and the electrolytic solution are detected at step S2.

The status detection at step S2 includes measuring the discharge current (detecting the discharge current of the electrode assembly A in FIG. 8) at step S2A, measuring the internal resistance (detecting the internal resistance of the electrode assembly A in FIG. 9) at step S2B, measuring the electrolytic solution resistance (detecting the resistance of the discharged electrolytic solution in FIG. 9) at step S2C, and measuring the electrolytic solution density at step S2D. These steps S2A to S2D may be carried out fully, or only a selected step of them may be carried out.

At the subsequent step S3, the electrolytic solution flow mechanism is operated to control the supply of the electrolytic solution to the battery container according to the detected value that was obtained in previous steps S2A to S2D. On this occasion, the actual supply of the electrolytic solution is sensed, and the obtained data is put in at step S4. The supply is represented as the supply rate of the electrolytic solution (L/h) in FIG. 10, while it is represented as the supply rate of the electrolytic solution per unit time (L/sec) in the embodiment shown in FIG. 8.

Then, the process determines whether the battery has transited to a long-term halting state at step S5, and the process determines whether the discharge has ended in a low voltage at the following step S6. If both conditions are false (N) at steps S5 and S6, the process returns to step S2 and repeats the control.

At the above step S5, a determination is made that the battery has transited to the long-term halting state, if the battery voltage is a predetermined voltage or less, or if the battery has not been started up for a predetermined period or more after it is determined that the discharge has ended. The determination of long-term halting may be also made according to a button operation or the like by an operator of the device to which the liquid activated air battery is connected.

That is, the controller 20 shown in FIGS. 8 and 9 includes a determination means (step S5) that determines whether the liquid activated air battery has transited to the long-term halting state. As described below, if the determination means determines that the battery has transited to the long-term halting state, the controller 20 operates the depressurizing means of the electrolytic solution flow mechanism to dry the inside of the battery container.

If both of the above conditions are true (Y) at steps S5 and S6, the process continues with step S7 where the supply of the electrolytic solution is stopped. If the depressurizing means is provided, it is put into operation, and the process subsequently checks if the battery has been shut down in a dry condition at step S8, and the process ends.

If the battery can temporally halt the discharge like the liquid activated air battery C7 shown in FIG. 7, the halting state is kept, but the process can also return from step S8 to S1 to restart the battery as shown by the dotted line in the figure.

Figure 11A:
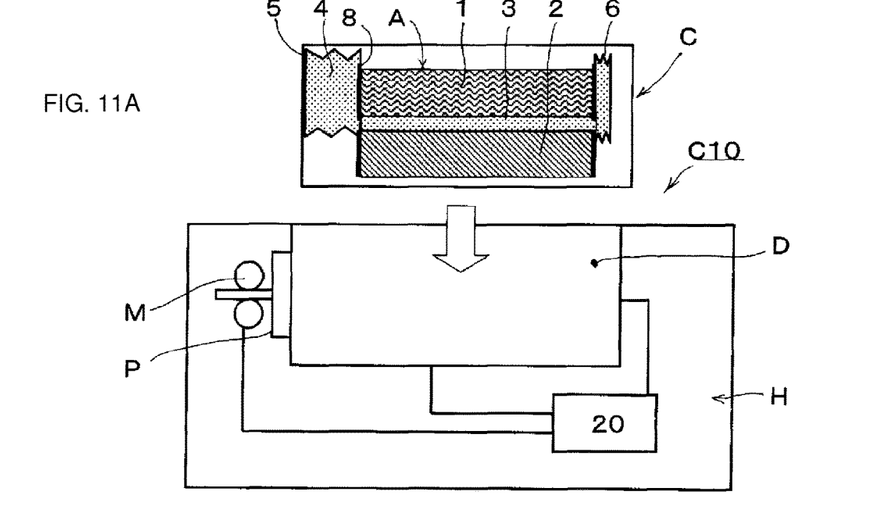
FIGS. 11A and 11B are cross sectional views of a liquid activated air battery according to further embodiment of the present invention, in the states where, in FIG. 11A, the cartridge is separated, and in FIG. 11B, the cartridge is attached.
Figure 11B:
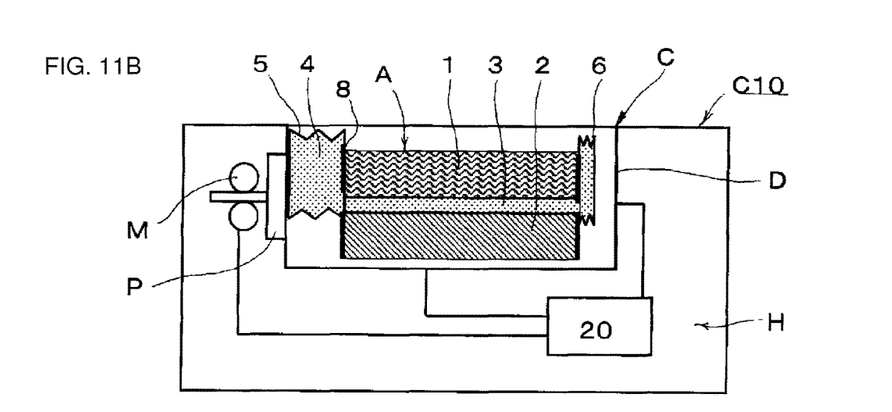

A liquid activated air battery C10 shown in FIGS. 11A and 11B includes an electrode assembly A, a supply tank 5 and a drainage tank 6 that are integrated with one another to provide a cartridge C, and also includes a holder H to which the cartridge is attachable.

The supply tank 5 and the drainage tank 6 of the cartridge C are bellows as with ones shown in FIGS. 3A and 3B, and are expandable and shrinkable. The holder H includes a dock D for the cartridge C, and also includes a motor M and a push plate P that are directed at the dock D and work as a pressurizing means of an electrolytic solution flow mechanism. As with the embodiment shown in FIG. 8, the holder H of the embodiment shown in the figure also includes a controller 20 that controls the supply of the electrolytic solution 4 to the battery container 8 according to the discharge current of the electrode assembly A during the discharge.

In the liquid activated air battery C10, the cartridge C is separated from the holder H as shown in FIG. 11A. The liquid activated air battery C10 starts up when the cartridge C is attached to the dock D of the holder H as shown in FIG. 11B. The supply tank 5 is squeezed with the motor M through the push plate P, and the electrolytic solution 4 is thus supplied to the battery container 8 by pressure, while the used electrolytic solution 4 is discharged to the drainage tank 6.

As with the foregoing embodiment, the battery container 8 is always supplied with fresh electrolytic solution 4 having a constant composition, and the deposits are discharged from the battery container 8, which ensures stable power output of the liquid activated air battery C10. Also, a simplified structure, downsizing and weight reduction are achieved. Furthermore, since the cartridge C and holder H are separated in the liquid activated air battery C10, the battery is easily replaced and the recycling cost is reduced.

Aside from integrating the electrode assembly A with the tanks 5 and 6 to provide the cartridge C as described above, the electrode assembly A may be separated from the tanks 5 and 6, or an actuator including the motor M, a power transmitter and the controller 20 may be selectively separated. For example, if a heavy, bulky or high-cost component is separated, low cost and good operability are achieved.

Since the liquid activated air batteries C1 to C10 described in the above embodiments are not only downsized and weight-reduced but also provide stable power output, they are highly suitable for main or auxiliary power sources that are mounted on moving vehicles such as cars, trains and ships. Those embodiments may be suitably selected according to the moving vehicle and usage.

The liquid activated air battery according to the present invention is not limited to the above-described embodiments, and details of each component may be modified without departing from the scope of the present invention.

In the embodiments shown in FIGS. 8 to 11, the supply of the electrolytic solution to the battery container is controlled according to the status parameter of the electrode assembly or electrolytic solution. However, in order to maintain a constant composition of the electrolytic solution in the battery container, the operation status of the electrolytic solution flow mechanism (pressurizing and/or depressurizing means) may be monitored and fed back to it. The operation status of the electrolytic solution flow mechanism may be the number of revolution of the pump, displacement of the actuator, travel distance of the piston, deformation volume of the tank, or the like. The relation between these detectable values and the supply of the electrolytic solution may be preset.

The liquid activated air battery according to the present invention may be formed into various shapes such as rectangle and circle. A plurality of the batteries may also be connected. In this case, the electrolytic solution tank or the electrolytic solution flow mechanism (pressurizing and/or depressurizing means) may be shared between all or a part of the batteries, whereby downsizing and weight reduction of a liquid activated air battery system are achieved.

In the above-described embodiment, the supply tank is stocked with the electrolytic solution. However, the supply tank may be filled with the electrolytic solution at the time of startup. Another solute may be added at or after the filling in order to adjust the composition of the electrolytic solution.

The invention claimed is:

1. A liquid activated air battery, comprising:
an electrode assembly that comprises an air electrode and a metal anode;
a battery container configured to hold the electrode assembly and an electrolytic solution within the electrode assembly;
a supply tank positioned on one end of the battery container and configured to supply fresh electrolytic solution to the battery container;
a drainage tank positioned on another end of the battery container and configured to receive the electrolytic solution that is discharged from the battery container, wherein the supply tank has an exterior wall with first bellows that are expanded to a volume of the fresh electrolytic solution and the drainage tank has an exterior wall with second bellows that are contracted prior to receiving the electrolytic solution from the battery container; and
an actuator on the supply tank only that pushes an end wall of the supply tank toward the battery container to shrink the supply tank as the supply of the fresh electrolytic solution is fed to the battery container so that the battery container is always supplied with fresh electrolytic solution having a constant composition, the exterior wall of the drainage tank expanding and an end wall of the discharge tank moving away from the battery container as the electrolytic solution from the battery is received by the drainage tank, such that the first bellows of the exterior wall of the supply tank are contracted and the second bellows of the exterior wall of the discharge tank are expanded when the battery container has received all of the fresh electrolytic solution from the supply tank.

2. The liquid activated air battery according to claim 1, further comprising:
a check valve that allows flow in a direction from the supply tank to the drainage tank, wherein the check valve is disposed at least between the supply tank and the battery.

3. The liquid activated air battery according to claim 1, further comprising:
a controller that controls supply of the electrolytic solution to the battery container according to a status parameter of the electrode assembly and/or the electrolytic solution during discharge.

4. The liquid activated air battery according to claim 3, wherein the status parameter is discharge current of the electrode assembly.

5. The liquid activated air battery according to claim 3, wherein the status parameter is at least one of internal resistance of the electrode assembly and resistance of the electrolytic solution discharged from the battery container.

6. The liquid activated air battery according to claim 3, wherein the status parameter is density of the electrolytic solution discharged from the battery container.

7. The liquid activated air battery according to claim 1, wherein the electrode assembly further comprises a separator between the air electrode and the metal anode, the separator extending in a direction between the supply tank and the drainage tank, the first bellows and second bellows shrinking and expanding along the direction in which the separator extends.

8. The liquid activated air battery according to claim 1, wherein the supply tank and the drainage tank are in direct contact with opposing sides of the battery container.

9. The liquid activated air battery according to claim 8, wherein the supply tank has a movable exterior wall opposite the battery container and the drainage tank has a movable exterior wall opposite the battery container.

10. The liquid activated air battery according to claim 1, wherein the electrolytic solution flows in a linear direction in the electrode assembly and the first bellows of the supply tank shrink and the second bellows of the discharge tank expand in the linear direction.

* * * * *